(12) United States Patent
Park et al.

(10) Patent No.: US 12,147,041 B2
(45) Date of Patent: Nov. 19, 2024

(54) DIFFRACTION LIGHT GUIDE PLATE

(71) Applicant: LG CHEM, LTD., Seoul (KR)

(72) Inventors: Seong Min Park, Daejeon (KR); Jeong Ho Park, Daejeon (KR); Sang Choll Han, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 662 days.

(21) Appl. No.: 17/436,559

(22) PCT Filed: Mar. 2, 2020

(86) PCT No.: PCT/KR2020/002961
§ 371 (c)(1),
(2) Date: Sep. 3, 2021

(87) PCT Pub. No.: WO2020/184885
PCT Pub. Date: Sep. 17, 2020

(65) Prior Publication Data
US 2022/0206300 A1    Jun. 30, 2022

(30) Foreign Application Priority Data
Mar. 13, 2019  (KR) .......................... 10-2019-0028514

(51) Int. Cl.
*G02B 27/01*   (2006.01)
*G02B 27/42*   (2006.01)
*G02B 27/44*   (2006.01)

(52) U.S. Cl.
CPC ..... *G02B 27/0172* (2013.01); *G02B 27/0176* (2013.01); *G02B 27/4205* (2013.01); *G02B 27/44* (2013.01); *G02B 2027/0178* (2013.01)

(58) Field of Classification Search
CPC ............ G02B 27/0172; G02B 27/0176; G02B 27/4205; G02B 27/44; G02B 2027/0178;
(Continued)

(56) References Cited

U.S. PATENT DOCUMENTS

2006/0126182 A1*  6/2006  Levola ............... G02B 27/0081
359/569
2014/0268067 A1   9/2014  Akiyama et al.
(Continued)

FOREIGN PATENT DOCUMENTS

CN   106575034 A   4/2017
CN   106662754 A   5/2017
(Continued)

*Primary Examiner* — Darryl J Collins
*Assistant Examiner* — Matthew Y Lee
(74) *Attorney, Agent, or Firm* — Bryan Cave Leighton Paisner LLP

(57) ABSTRACT

A diffraction light guide plate capable of increasing the area of an output image without increasing the total size thereof and having an advantage that the pupil position of a user is not limited. The diffraction light guide plate comprises first and second diffraction optical elements, wherein the first diffraction optical element is an element capable of receiving light incident onto the first diffraction optical element and outputting the received light toward the second diffraction optical element, and the second diffraction optical element is an element capable of emitting light therefrom out of the incident light from the first diffraction optical element.

20 Claims, 11 Drawing Sheets

(58) Field of Classification Search
CPC .. G02B 27/0081; G02B 5/1823; G02B 27/42; G02B 5/1814; G02B 5/1819; G02B 5/1866
USPC .......................................................... 359/568
See application file for complete search history.

(56) References Cited

U.S. PATENT DOCUMENTS

| | | | | |
|---|---|---|---|---|
| 2017/0315346 | A1* | 11/2017 | Tervo | G02B 5/1819 |
| 2018/0059297 | A1 | 3/2018 | Peroz et al. | |
| 2019/0187474 | A1* | 6/2019 | Bhargava | G02B 27/0081 |
| 2020/0150430 | A1* | 5/2020 | Minemura | G02B 27/0101 |
| 2021/0165142 | A1* | 6/2021 | Blomstedt | G02B 27/0172 |

FOREIGN PATENT DOCUMENTS

| | | |
|---|---|---|
| CN | 108681067 A | 10/2018 |
| CN | 108885347 A | 11/2018 |
| JP | 2006-154102 A | 6/2006 |
| JP | 2015105990 | 6/2015 |
| JP | 2015-534117 A | 11/2015 |
| JP | 2016-66225 A | 4/2016 |
| JP | 2016-122098 A | 7/2016 |
| JP | 2017-156388 A | 9/2017 |
| JP | 2017-156656 A | 9/2017 |
| JP | 2017-528739 A | 9/2017 |
| JP | 2018-513414 A | 5/2018 |
| KR | 10-1029926 B1 | 4/2011 |
| KR | 10-2015-0097634 A | 8/2015 |
| KR | 10-2017-0015942 A | 2/2017 |
| KR | 10-2017-0039655 A | 4/2017 |
| KR | 10-2018-0070542 A | 6/2018 |
| WO | 2015-033552 A1 | 3/2015 |
| WO | 2017223121 A1 | 12/2017 |
| WO | 2018-220266 A1 | 12/2018 |
| WO | 2018/231754 A1 | 12/2018 |

\* cited by examiner

DIFFRACTION LIGHT GUIDE PLATE

CROSS-REFERENCE TO RELATED APPLICATIONS

This application is a National Stage Application of International Application No. PCT/KR2020/002961 filed on Mar. 2, 2020, which claims priority to Korean Patent Application No. 10-2019-0028514 filed on Mar. 13, 2019, the disclosures of which are incorporated herein by reference in their entireties.

FIELD OF DISCLOSURE

The present application relates to a diffraction light guide plate and a use thereof.

BACKGROUND

An augmented reality (AR) technology refers to a technology in which a three-dimensional virtual image is superimposed on an actual image and projected into one image. Optical devices implementing augmented realities comprise diffraction light guide plates that utilize diffraction phenomena based on the wave nature of light.

A conventional diffraction light guide plate has been schematically shown in FIG. 1. The conventional diffraction light guide plate (10) comprises an input diffraction optical element (11), an intermediate diffraction optical element (12), and an output diffraction optical element (13) each having a diffraction grating formed thereon. Specifically, the input diffraction optical element (11) is configured so that it receives light incident from a light source (P), outputs the received light toward the intermediate diffraction optical element, and totally reflects the light in the light guide plate. The intermediate diffraction optical element (12) is configured so that it receives light diffracted from the input diffraction optical element (11), and extends the received light in a single first direction (e.g., a direction parallel to the z-axis in FIG. 1) by diffraction towards the output diffraction optical element. The output diffraction optical element (13) is configured so that it may receive the light extended by the intermediate diffraction optical element (12), and output the received light in a direction toward pupils of a user in a state extended in a single second direction (direction parallel to the y-axis in FIG. 1) by diffraction.

The main light path, for which the light output from the light source (P) reaches the pupils of the user, consists of an input diffraction optical element (11)→an intermediate diffraction optical element (12)→an output diffraction optical element (13)→user's pupils, sequentially in this order. In this case, in order to increase the region where the user can recognize the images output from the diffraction light guide plate, the size of the intermediate diffraction optical element and the output diffraction optical element inevitably need to be increased.

However, when the size of the diffraction optical elements in the light guide plate is increased, the size of the diffraction light guide plate is increased. Because the size of the optical device to which the diffraction light guide plate is applied increases accordingly, there has been a limitation in the conventional design of the diffraction light guide plate to meet the technical trend of miniaturizing or lightening the optical device.

In order to solve the problem of the diffraction light guide plate having the structure as shown in FIG. 1, the shape of the diffraction light guide plate having the structure as shown in FIG. 2 has been considered. Specifically, as shown in FIG. 2, the shape of the diffraction light guide plate comprising the first diffraction optical element (120), and the output diffraction optical element (130) having the first region (131) and the second region (132), which have different one-dimensional diffraction patterns and are disposed opposite to each other, has been considered. Since the output diffraction optical element replaces the role of the conventional intermediate and output diffraction optical elements, the diffraction light guide plate in the same form as FIG. 2 has been capable of increasing the area of the output image without increasing the total size thereof.

In the diffraction light guide plate in the same form as FIG. 2, the image input to the diffraction light guide plate is divided by the first region and the second region in the output diffraction optical element and output. At this time, in order for the user to recognize both the images output by the first region and the second region, the pupils of the user should be located in both of the images. However, the size of the region (a in FIG. 3) where the user can recognize both of the images output by the diffraction light guide plate in the same form as FIG. 2 is relatively small. Therefore, in the diffraction light guide plate in the same form as FIG. 2, when the position of the pupils is even slightly changed, in particular, there is a problem that the images output from the boundary between the first region and the second region is not recognized by the user or is recognized relatively dimly even if recognized. That is, for recognizing all of the images output from the diffraction light guide plate of FIG. 2, there is a problem that the position of the pupils of the user is limited.

SUMMARY

It is one object of the present application to provide a diffraction light guide plate suitable for miniaturizing or lightening an optical device.

It is another object of the present application to provide a diffraction light guide plate capable of increasing the area of an output image without increasing the total size thereof.

It is another object of the present application to provide a diffraction light guide plate that the pupil position of the user is not limited.

The object of the present application is not limited to the above-mentioned objects.

The angle defined in the present application should be understood in consideration of manufacturing errors or variations, and the like. For example, the term such as "vertical," "parallel," "orthogonal" or "horizontal" applied in the present application may mean substantially vertical, parallel, orthogonal or horizontal within the range without impairing the intended meaning of the term. In addition, the terms may each be understood in view of an error within about ±10 degrees, an error within about ±5 degrees, an error within about ±3 degrees, an error within about ±2 degrees, an error within about ±1 degree or an error within about ±0.5 degrees.

The angle formed by any two directions mentioned in the present application may be an acute angle from an acute angle and an obtuse angle formed by the two directions, or may mean a value having a small absolute value among the angles formed by the two directions, unless otherwise specified.

The angle referred to in the present application is positive unless otherwise specified. However, in some cases, in order to indicate a measurement direction between the angles measured in a clockwise direction or a counterclockwise direction, the angle measured in the clockwise direction may be expressed as positive and the angle measured in the counterclockwise direction may be expressed as negative.

In the present application, the "plane direction" may mean a direction parallel to a plane having a maximum area in a diffraction light guide plate, for example, a direction parallel to a plane formed by the other two axes except for the shortest axis of the diffraction light guide plate. Specifically, upon representing three axes perpendicular to one another formed in the diffraction light guide plate by the x-axis, the y-axis and the z-axis, respectively, where the z-axis is set in a direction parallel to the gravity direction, when the relationship of "the length in the x-axis direction>the length in the z-axis direction>the length in the y-axis direction" or the relationship of "the length in the z-axis direction>the length in the x-axis direction>the length in the y-axis direction" is established, the plane direction may mean a direction parallel to the plane formed by the x-axis and the z-axis of the diffraction light guide plate.

In the present application, the "thickness direction" may mean a normal direction of a plane having a maximum area of the diffraction light guide plate. That is, the thickness direction of the diffraction light guide plate may mean the direction of the plane direction normal, and in the above example, it may mean the y-axis direction.

In the present application, the reference wavelength of optical properties such as the term "transmittance" or "refractive index" may be determined according to the wavelength of light to be diffracted by applying a diffraction light guide plate. For example, when the diffraction light guide plate is intended to diffract light in the visible light region, the transmittance or the like may be a value based on light having any one wavelength in a range of 400 nm to 700 nm or a wavelength of about 525 nm. In another example, when it is intended to diffract light in the infrared region, the transmittance or the like may be, for example, a value based on light having a wavelength of about 1000 nm.

In the present application, the term "light guide part" may mean an optical element for performing a function of guiding light into a diffraction light guide plate. In addition, the function may be performed through total reflection by diffraction of light. In order for total reflection to occur in the light guide part, the refractive index of the light guide part must be larger than the refractive index of another medium adjacent to the surface of the light guide part. Since the light guide part is usually adjacent to air, the light guide part may be made of a material having a larger refractive index than air, for example, a transparent or translucent material such as glass and/or plastic.

Here, the term "transparency" may mean that the transmittance for light having a wavelength of visible light, for example, a wavelength of about 525 nm, is 80% or more, and the "translucency" may also mean that the transmittance for light having a wavelength of visible light, for example, a wavelength of about 525 nm is 50% or more and less than 80%.

In the present application, the term "diffraction optical element (DOE)" may mean an optical element that diffracts light in one or more directions and performs a function of changing the path of the relevant light. The diffraction optical element may comprise a diffraction grating.

The "diffraction grating" may mean an optical element that separates a spectrum of incident light according to wavelengths by using a diffraction phenomenon of light. For example, a plurality of parallel lines having a specific interval may be formed in intaglio or engraving on the light incident surface and/or the light exit surface of the light guide part, and the parallel lines thus formed may be referred to as a linear diffraction grating. That is, the diffraction grating may be a repetitive pattern of a physical uneven structure formed on the light incident surface and/or the light exit surface of the light guide part, that is, a line-and-space (L/S) pattern. In addition, the linear diffraction grating may have a form extending in a specific direction.

The path of the light that is changed in the diffraction optical element may vary depending on the aspect of the diffraction grating formed in the optical element. Accordingly, the shape of the diffraction grating (extension direction, etc.), the arrangement interval, the depth of the grating, or whether or not the parallel lines formed on the grating are in intaglio or engraving, and the like may be appropriately arranged or adjusted according to the intended light path in the diffraction light guide plate of the present application.

The present application relates to a diffraction light guide plate. Hereinafter, the diffraction light guide plate of the present application will be described in more detail with reference to the accompanying drawings.

FIG. 4 is a schematic diagram of a diffraction light guide plate of the present application.

The diffraction light guide plate (100) of the present application comprises a plurality of diffraction optical elements (120, 130) formed on one side (in the above example, a plane formed by the x-axis and the z-axis) formed by the light guide part. Specifically, the diffraction light guide plate comprises a first diffraction optical element (120) and a second diffraction optical element (130). In addition, the plurality of diffraction optical elements may be disposed on one side (110a or 110b) of the light guide part (110). The plurality of diffraction optical elements may be disposed on the same side of the light guide part.

In another example, the first diffraction optical element may also be referred to as an input diffraction optical element, and the second diffraction optical element may also be referred to as an output diffraction optical element. That is, the light incident on the first diffraction optical element may be an image signal, and the second diffraction optical element may form an image output surface. In the accompanying drawing, the first diffraction optical element is shown as a circle and the second diffraction optical element is shown as a rectangle, without being limited thereto.

Here, the first diffraction optical element may receive light incident on the diffraction light guide plate. In addition, the first diffraction optical element may output the received light toward the second diffraction optical element by diffraction.

Here, the second diffraction optical element may emit light incident from the first diffraction optical element. The emitted light may be directed at the pupils of the user.

The light incident on the first diffraction optical element may be incident at an incident angle in a range of −50 degrees to 50 degrees with the normal of the first diffraction optical element. In another example, the incident angle may be −45 degrees or more, −40 degrees or more, −35 degrees or more, −30 degrees or more, −25 degrees or more, −20 degrees or more, −15 degrees or more, −10 degrees or more, −5 degrees or more, −3 degrees or more, or −1 degree or more, and may be 45 degrees or less, 40 degrees or less, 35 degrees or less, 30 degrees or less, 25 degrees or less, 20 degrees or less, 15 degrees or less, 10 degrees or less, 5 degrees or less, 3 degrees or less, or 1 degree or less.

The light emitted by the second diffraction optical element may be emitted at an output angle in a range of −50 degrees to 50 degrees with the normal of the second diffraction optical element. In another example, the output angle may be −45 degrees or more, −40 degrees or more, −35 degrees or more, −30 degrees or more, −25 degrees or more, −20 degrees or more, −15 degrees or more, −10 degrees or more, −5 degrees or more, −3 degrees or more, or −1 degree or more, and may be 45 degrees or less, 40 degrees or less, 35 degrees or less, 30 degrees or less, 25 degrees or less, 20 degrees or less, 15 degrees or less, 10 degrees or less, 5 degrees, 3 degrees or less, or 1 degree or less.

Here, the normal of the first diffraction optical element may be the normal to the light incident surface of the light guide part, and the normal of the second diffraction optical element may be the normal to the light exit surface of the light guide part. Here, the light incident surface may be a surface in which incident light is incident on the first diffraction optical element, and the light exit surface may be a surface in which exit light is emitted from the second diffraction optical element. The light incident surface and the light exit surface may also exist on the same plane of the light guide part or may also exist on different planes, but it may be preferable that the surfaces are present on the same plane in consideration of the desired function of the diffraction light guide plate and the advantages of the manufacturing process, and the like.

In one example, the absolute value of the difference between the absolute value of the incident angle of the light incident on the first diffraction optical element and the absolute value of the output angle of the light emitted by the second diffraction optical element may be 10 degrees or less, 8 degrees or less, 6 degrees or less, 4 degrees or less, 2 degrees or less, or 1 degree or less, and may be more than 0 degrees, 0.5 degrees or more, or 1 degree or more. When the light incident surface and the light exit surface exist on the same plane of the diffraction light guide plate, the incident angle and the output angle may be opposite in sign to each other, and at the same time, the absolute value of the difference between the absolute values of the respective angles may satisfy the above range. In another example, when the light incident surface and the light exit surface exist on different planes of the diffraction light guide plate, the incident angle and the output angle may have the same sign with each other, and at the same time, the absolute value of the difference between the respective angles may satisfy the above range.

In the present application, unless otherwise specified, the term incident angle is an angle measured based on a normal of a light incident surface, where the angle measured in the clockwise direction based on the normal is expressed as a positive number and the angle measured in the counterclockwise direction is expressed as a negative number. In addition, the incident angle may be an angle having a small absolute value among angles formed by the incident light and the normal.

In the present application, unless otherwise specified, the term output angle is an angle measured based on a normal of a light exit surface, where the angle measured in the clockwise direction based on the normal is expressed as a positive number and the angle measured in the counterclockwise direction is expressed as a negative number. The output angle may be an angle having a small absolute value among angles formed by the emission light and the normal.

The first diffraction optical element comprises a diffraction grating, specifically, a linear diffraction grating extending in either direction. As described above, the linear diffraction grating may mean a plurality of parallel lines formed in intaglio or engraving on the light incident surface and/or the light exit surface of the light guide part, and the traveling direction of the parallel lines may be the extension direction of the linear diffraction grating. In addition, the traveling direction of the parallel lines may proceed in the plane direction. Specifically, in the above example, the traveling direction of the parallel lines may exist in the plane formed by the x-axis and the z-axis. Hereinafter, the extension direction of the diffraction grating included in the first diffraction optical element is referred to as a first direction. The first diffraction optical element may diffract incident light by the linear diffraction grating and output the light toward the second diffraction optical element, and allow the incident light to totally reflect in the light guide part.

The second diffraction optical element comprises a plurality of regions different from one another. Specifically, the second diffraction optical element comprises at least three regions different from one another. The second diffraction optical element comprises first to third regions, where the third region exists between the first region and the second region.

The first and second regions comprise linear diffraction gratings extending in directions different from each other. The extension directions of the linear diffraction gratings in the first and second regions are also different from the extension direction of the linear diffraction grating included in the first diffraction optical element as described above. Hereinafter, the extension direction of the linear diffraction grating of the first region is referred to as a second direction, and the extension direction of the linear diffraction grating of the second region is referred to as a third direction. The first to third directions are directions different from one another. However, similarly to the first direction, the second and third directions may also proceed in the plane direction. Specifically, in the above example, the second and third directions may also exist in the plane formed by the x-axis and the z-axis.

The third region also comprises a diffraction grating. Meanwhile, since the third region is located between the first region and the second region, the diffraction grating of the third region is in a form that the linear diffraction gratings of the first and second regions overlap. When the linear diffraction gratings having extension directions different from each other overlap, intersection points of parallel lines are formed along the traveling directions of the respective linear diffraction gratings, and since the parallel lines are formed in intaglio or engraving in the light guide part, the diffraction grating of the third region consists of a plurality of pillars in the form of dots (plane in a broad sense). Therefore, the diffraction grating of the third region may have a form that the plurality of pillars is disposed adjacent to each other at regular or irregular intervals.

Considering the desired function of the diffraction light guide plate and the advantages of the manufacturing process, and the like, it may be preferable that the first to third regions are present on the same plane of the light guide part. For example, as described below, when the first to third regions are manufactured by an imprinting process or the like, in order that the first to second regions are present on one side of the light guide part and the third region is on the other side of the light guide part, the imprinting process has to be performed two or more times (after a grating is formed on one side of the light guide part, another grating has to be formed on the other side, as the light guide part is turned over), but the reason is because it is inevitable that damage occurs on any one side due to the pressure applied in the process.

In the second diffraction optical element, the first to third regions are suitably disposed so that light incident from the first diffraction optical element is output through a specific light path. Specifically, the first to third regions of the second diffraction optical element are disposed so that light incident from the first diffraction optical element is directly incident thereon. More specifically, in the second diffraction optical element, the first region is arranged such that light incident from the first diffraction optical element is incident onto the first region without passing through the second and third regions. The second region is arranged such that light incident from the first diffraction optical element is incident onto the second region without passing through the first and third regions. The third region is arranged such that light incident from the first diffraction optical element is incident onto the third region without passing through the first and second regions.

When light incident from the first diffraction optical element passes through the first region, the light is incident onto the second and/or third region, and the light incident onto the second and/or third region is emitted to the outside. Similarly, when light incident from the first diffraction optical element passes through the second region, the light is incident on the first and/or third region, and the light incident onto the first and/or third region is emitted to the outside. In addition, when light incident from the first diffraction optical element passes through the third region, the light is incident onto the first and/or second region, and the light incident onto the first and/or second region is emitted to the outside.

As described above, the first region and the second region comprise linear diffraction gratings, where the linear diffraction grating is a line-and-space pattern which is parallel lines formed in intaglio/emboss. At this time, the light emission efficiency of the light emitted from the second diffraction optical element may vary depending on the height (or depth) of the grating, the pitch (repetition distance) of the grating and the thickness of the parallel line.

The light emission efficiency of the light emitted from the second diffraction optical element tends to be kept somewhat low regardless of the height (or depth) of the diffraction grating in the third region. The light quantity of the light totally reflected inside the diffraction light guide plate decreases along a direction away from the first diffraction optical element. In order to maintain a uniform light emission quantity of the light emitted from the diffraction light guide plate, it is necessary to arrange a plurality of regions in the light output diffraction optical element (second diffraction optical element) so that the region adjacent to the first diffraction optical element has a relatively low light emission efficiency and the region far from the first diffraction optical element has a relatively high light emission efficiency. Thus, it is appropriate that the third region where the light emission efficiency is kept low regardless of the depth (or height) of the diffraction grating is disposed between the first and second regions where the light emission efficiency can be adjusted according to the depth (or height) of the diffraction grating. Meanwhile, as shown in FIG. 6, it can be considered to design a second diffraction optical element, on which a diffraction grating having only a form that linear diffraction gratings in different directions overlap is formed, but as described above, in the case of the diffraction grating in which two or more linear diffraction gratings having different traveling directions overlap as in the third region, even if the pitch, width or height (or depth), and the like of the relevant grating is adjusted, the light emission efficiency of the relevant element is mostly kept low. Therefore, in this case, there is a problem that the light emission amount of the image emitted from the second diffraction optical element is uneven.

Here, the height (or depth) of the diffraction grating may mean the depth (or height) of the intaglio or engraving formed in the diffraction grating. Specifically, in the above example, when the diffraction grating is formed on the plane formed by the x-axis and the z-axis and its intaglio or engraving is formed on the plane formed by the x-axis and the z-axis, the length of the intaglio (or engraving) in the y-axis direction may be referred to as the height (or depth) of the diffraction grating.

The traveling directions (second and third directions) of the linear diffraction gratings in the first and second regions and the traveling direction (first direction) of the linear diffraction grating in the first diffraction optical element may form a triangle. As described above, in the linear diffraction gratings formed in the first and second regions and the first diffraction optical element, respectively, the traveling directions of the linear diffraction gratings may mean traveling directions of their parallel lines. Therefore, when all the virtual lines formed by the first to third directions are connected, a triangle may be formed.

The angle formed by the traveling directions of the linear diffraction gratings in the first and second regions, that is, the second direction and the third direction may be in a range of 50 degrees to 70 degrees. In another example, the angle may be 53 degrees or more, 55 degrees or more, 57 degrees or more, or 59 degrees or more, may be 67 degrees or less, 65 degrees or less, 63 degrees or less, or 61 degrees or less, and may be about 60 degrees. The angle may mean an angle having an acute angle or an angle having a small absolute value among angles formed by the second and third directions.

In another example, the linear diffraction gratings of the first and second regions may be symmetrical based on the intersection point of the respective linear diffraction gratings. That is, the absolute value of the sum of the angles formed by the second traveling direction and the third traveling direction, respectively, with respect to the virtual line connecting the intersection points forming the second traveling direction and the third traveling direction may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees.

The angle formed by the traveling direction of the linear diffraction grating in the first or second region and the traveling direction of the linear diffraction grating in the first diffraction optical element may be in a range of 50 degrees to 70 degrees. That is, the angle formed by the first direction and the second direction or the angle formed by the first direction and the third direction may be in a range of 50 degrees to 70 degrees. In another example, the angle may be 53 degrees or more, 55 degrees or more, 57 degrees or more, or 59 degrees or more, may be 67 degrees or less, 65 degrees or less, 63 degrees or less, or 61 degrees or less, and may be about 60 degrees. The angle may mean an angle having a small absolute value among angles formed by the first direction and the second direction (or angles formed by the first direction and the third direction). The angle formed by the first direction and the second direction and the angle formed by the first direction and the third direction may be the same or different from each other, and in one example, it may be appropriate that they are the same.

The average height of the diffraction grating in the first or second region may be in a range of more than 0 nm to 1 μm or less, and specifically, it may be 1 nm or more, 10 nm or more, 20 nm or more, 30 nm or more, 40 nm or more, 50 nm or more, 100 nm or more, 200 nm or more, or 250 nm or more, and may be 900 nm or less, 800 nm or less, 700 nm or less, 600 nm or less, 500 nm or less, 450 nm or less, 400 nm or less, or 350 nm or less. The average height of the diffraction grating in the first or second region is in a range of 1 nm to 1 μm. As described above, the first or second region comprises a linear diffraction grating, where the linear diffraction grating may be a repetitive pattern of physical concavo-convex structures, that is, a line-and-space (L/S) pattern, formed on the light incident surface and/or the light exit surface of the light guide part, and thus the height of the diffraction grating may mean the height or depth of the protrusion part in the line-and-space. In addition, the average height (or average depth) of the diffraction grating may be an arithmetic mean of the heights of the diffraction gratings, or may be an average of the maximum height and the minimum height. The average heights (or average depths) of the diffraction gratings of the first and second regions may be the same or different from each other, and in one example, they may also be the same. Specifically, in the above example, when the diffraction grating is formed on the plane formed by the x-axis and the z-axis, and its intaglio or engraving is formed on the plane formed by the x-axis and the z-axis, the length in the y-axis direction may be referred to as the height (or depth) of the diffraction grating.

The average pitch of the diffraction grating of the first region or the second region may be in a range of 200 nm to 600 nm. In another example, the average pitch may be 210 nm or more, 220 nm or more, 230 nm or more, 240 nm or more, 250 nm or more, 260 nm or more, 270 nm or more, 280 nm or more, 290 nm or more, 300 nm or more, 310 nm or more, 320 nm or more, 330 nm or more, 340 nm or more, 350 nm or more, 360 nm or more, 370 nm or more, or 380 nm or more, and may be 590 nm or less, 580 nm or less, 570 nm or less, 560 nm or less, 550 nm or less, 540 nm or less, 530 nm or less, 520 nm or less, 510 nm or less, 500 nm or less, 490 nm or less, 480 nm or less, 470 nm or less, 460 nm or less, 450 nm or less, 440 nm or less, 430 nm or less, 420 nm or less, 410 nm or less, or 400 nm or less. Here, the pitch of the diffraction grating may mean the shortest distance between any one parallel line formed in the diffraction grating and another parallel line. The average pitch of the diffraction grating may mean the arithmetic mean of the pitches or the average value of the minimum value and the maximum value of the pitches. Here, the average pitches of the diffraction gratings of the first region and the second region may be the same or different from each other, and in one example, they may also be the same.

The average width of the diffraction grating in the first or second region may be in a range of 0.1 times to 0.9 times the average pitch of the diffraction pattern. In another example, the value may be 0.2 times or more, 0.3 times or more, 0.4 times or more, or 0.5 times or more the average pitch of the diffraction pattern, and may be 0.8 times or less, 0.7 times or less, 0.6 times or less, or 0.5 times or less. The width of the diffraction grating may mean the width of any one parallel line formed in the diffraction grating. The average width of the diffraction grating may mean the arithmetic mean of the widths or the average value of the minimum value and the maximum value of the widths. The average widths of the diffraction gratings of the first region and the second region may be the same or different from each other, and in one example, they may be the same.

The refractive index of the first or second region may be in a range of more than 1.0 to 2.0 or less. In another example, the refractive index may be 1.1 or more, 1.2 or more, 1.3 or more, 1.4 or more, 1.5 or more, 1.6 or more, 1.7 or more, or 1.8 or more, and may be 1.9 or less, or 1.8 or less. The reference wavelength of the refractive index may be 525 nm. The method of measuring the refractive index is known. For example, by applying Metricon's prismatic coupler, the refractive index may be measured according to the manufacturer's manual.

Here, the average width, average height or average pitch of the diffraction grating in the first or second region and the refractive index of the first or second region, and the like may be variously changed according to design parameters (for example, wavelengths of light intended to be diffracted or widths of light output image regions, and the like) of the diffraction light guide plate of the present application.

As described above, the diffraction grating of the third region is in a form that the respective diffraction gratings of the first region and the second region overlap, and when the linear diffraction gratings having extension directions different from each other overlap, the intersection points of parallel lines along the traveling directions of the respective linear diffraction gratings are formed and the parallel lines are formed in intaglio or engraving in the light guide part, so that the diffraction grating of the third region consists of a plurality of pillars in the form of points (plane in a broad sense). That is, the diffraction grating of the third region may have a repetitive shape of a plurality of pillars formed on one side of the second diffraction optical element. The cross section of the pillar may have a form of a curvilinear diagram such as a circle or an ellipse; a polygon such as a triangle, a square or a pentagon; or amorphism, and the like. In one example, the cross section of the pillar may be a curvilinear diagram such as a circle or an ellipse.

The average pitch of the diffraction grating of the third region, specifically, the average pitch of the plurality of pillars constituting the diffraction grating of the third region may be in a range of 200 nm to 600 nm. In another example, the average pitch may be 210 nm or more, 220 nm or more, 230 nm or more, 240 nm or more, 250 nm or more, 260 nm or more, 270 nm or more, 280 nm or more, 290 nm or more, 300 nm or more, 310 nm or more, 320 nm or more, 330 nm or more, 340 nm or more, 350 nm or more, 360 nm or more, 370 nm or more, or 380 nm or more, and may be 590 nm or less, 580 nm or less, 570 nm or less, 560 nm or less, 550 nm or less, 540 nm or less, 530 nm or less, 520 nm or less, 510 nm or less, 500 nm or less, 490 nm or less, 480 nm or less, 470 nm or less, 460 nm or less, 450 nm or less, 440 nm or less, 430 nm or less, 420 nm or less, 410 nm or less, or 400 nm or less. Here, in the triangle formed by the center of any one dot-shaped pillar constituting the diffraction grating of the third region and the centers of the dot-shaped pillars adjacent to the pillar, the pitch of the diffraction grating of the third region may mean the length of the line segment from any one vertex toward the line segment formed by the remaining two vertexes. Here, the average pitch of the diffraction grating in the third region may be an arithmetic mean of the pitches or an average value of the minimum value and the maximum value of the pitches.

Here, the average width of the diffraction grating in the third region, specifically, the average width of the pillars in the diffraction grating of the third region may be 0.1 times or more to 1.3 times or less the average pitch of the diffraction grating. In another example, the value may be 0.2 times or more, 0.3 times or more, 0.4 times or more, or 0.5 times or more the average pitch of the diffraction grating, and may be 1.2 times or less, 1.1 times or less, 1.0 times or less, 0.9 times or less, 0.8 times or less, 0.7 times or less, 0.6 times or less, or 0.5 times or less.

Here, the average width of the pillars in the diffraction grating of the third region may be in a range of 100 nm to 400 nm. The average width may be 110 nm or more, 120 nm or more, 130 nm or more, 140 nm or more, 150 nm or more, 160 nm or more, 170 nm or more, 180 nm or more, 190 nm or more, or 200 nm or more, and may be 390 nm or less, 380 nm or less, 370 nm or less, 360 nm or less, 350 nm or less, 340 nm or less, 330 nm or less, 320 nm or less, 310 nm or less, 300 nm or less, 290 nm or less, 280 nm or less, 270 nm or less, 260 nm or less, 250 nm or less, 240 nm or less, 230 nm or less, 220 nm or less, 210 nm or less, or 200 nm or less. Here, the width of the pillar in the diffraction grating may mean a width of one of the pillars formed in the diffraction grating of the third region. Specifically, when the cross section of the pillar is a circle, the width may mean the diameter of the circle, and when it is an ellipse, the width may mean the length of the long axis. When the cross section of the pillar is a triangle, the width may mean the maximum length of the heights of the respective sides, and when it is a polygon of a rectangle or more, the width may mean the maximum value of the lengths of the plurality of diagonal lines. When the cross section of the pillar is amorphism, the width may mean the maximum value of the lengths between one end and another end. In addition, the average width of the pillars may mean the arithmetic mean of the widths of the plurality of diagrams formed in the grating or the average value of the minimum value and the maximum value of the widths.

The average height of the diffraction grating in the third region, specifically, the average height of the pillars in the diffraction grating of the third region may be in a range of more than 0 nm to 1 μm or less, which may be, specifically, 1 nm or more, 10 nm or more, 20 nm or more, 30 nm or more, 40 nm or more, 50 nm or more, 100 nm or more, 200 nm or more, or 250 nm or more, and may be 900 nm or less, 800 nm or less, 700 nm or less, 600 nm or less, 500 nm or less, 450 nm or less, 400 nm or less, or 350 nm or less. The average height of the diffraction grating in the first or second region is in a range of 1 nm to 1 μm. Here, the height of the diffraction grating in the third region may mean the shortest distance from which the pillar is spaced from the surface of the region, and the average height may mean the arithmetic mean of the heights of the plurality of diagrams constituting the diffraction pattern, or the average value of the maximum value and the minimum value of the heights. Specifically, in the above example, when the diffraction grating is formed on the plane formed by the x-axis and the z-axis, and its intaglio or engraving is formed on the plane formed by the x-axis and the z-axis, the length of the intaglio (or engraving) in the y-axis direction may be referred to as the height (or depth) of the diffraction grating.

The refractive index of the third region may be in a range of more than 1.0 to 2.0 or less. In another example, the refractive index may be 1.1 or more, 1.2 or more, 1.3 or more, 1.4 or more, 1.5 or more, 1.6 or more, 1.7 or more, or 1.8 or more, and may be 1.9 or less, or 1.8 or less. The reference wavelength of the refractive index may be 525 nm. The method of measuring the refractive index is known. For example, by applying Metricon's prismatic coupler, the refractive index may be measured according to the manufacturer's manual.

Here, the average width, average height or average pitch of the diffraction grating in the third region and the refractive index of the third region, and the like may be variously changed according to design parameters (for example, wavelengths of light intended to be diffracted or widths of light output image regions, and the like) of the diffraction light guide plate.

Here, the tilt angle of the diffraction grating formed in each of the first to third regions is not particularly limited. For example, the tilt angle may be −45 degrees or more, −40 degrees or more, −35 degrees or more, −30 degrees or more, −25 degrees or more, −20 degrees or more, −15 degrees or more, −10 degrees or more, or −5 degrees or more, based on the normal of the second diffraction optical element, may be 45 degrees or less, 40 degrees or less, 35 degrees or less, 30 degrees or less, 25 degrees or less, 20 degrees or less, 15 degrees or less, 10 degrees or less, or 5 degrees or less, and may also be about 0 degrees. Here, the tilt angle of the diffraction grating may mean an angle having a small absolute value among the angles that the parallel lines or pillars formed in the diffraction grating form with the normal of the first or second diffraction optical element.

As described above, the diffraction grating of the third region is in a form that the linear diffraction gratings formed in the first and second regions overlap. That is, in the third region, both a linear diffraction grating traveling in substantially the same direction as the linear diffraction grating of the first region and a linear diffraction grating traveling in substantially the same direction as the linear diffraction grating of the second region may exist. Since the traveling direction (second direction) of the linear diffraction grating in the first region and the traveling direction (third direction) of the linear diffraction grating in the second region are different, a plurality of intersection points formed by the second direction and the third direction may be formed in the third region. Hereinafter, the diffraction grating formed in the third region will be described in more detail.

Six pillars among the plurality of pillars in the form of dots constituting the diffraction grating of the third region may be selected such that the virtual line connecting the six pillars forms a hexagon. At this time, the angle that any one side of the hexagon forms with the traveling direction (first direction) of the diffraction grating in the first diffraction optical element may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees. The angle may be an angle having a small absolute value among angles formed by any one side of the hexagon and the first direction. That is, either side (A1) of the hexagon may be substantially parallel to the traveling direction of the linear diffraction grating in the first diffraction optical element.

Also, the angle that another side of the hexagon forms with the second direction may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees. The angle may be an angle having a small absolute value among angles formed by another side of the hexagon and the second direction. That is, another side (A2) of the hexagon may be substantially parallel to the traveling direction of the linear diffraction grating in the first region.

Furthermore, the angle that another side of the hexagon forms with the third direction may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees. The angle may be an angle having a small absolute value among angles formed by another side of the hexagon and the third direction. That is, another side (A3) of the hexagon may be substantially parallel to the traveling direction of the linear diffraction grating in the second region.

The angle formed by the side (A1) forming the angle in the range of −10 degrees to 10 degrees with the first direction among the hexagonal sides and the side (A1') facing the side may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees. The angle may be an angle having a small absolute value among the angles formed by A1 and A1'. That is, any one side (A1) of the hexagon and the side (A1') opposite thereto may be substantially parallel.

The angle formed by the side (A2) forming the angle in the range of −10 degrees to 10 degrees with the second direction among the hexagonal sides and the side (A2') facing the side may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees. The angle may be an angle having a small absolute value among the angles formed by A2 and A2'. That is, any one side (A2) of the hexagon and the side (A2') opposite thereto may be substantially parallel.

The angle formed by the side (A3) forming the angle in the range of −10 degrees to 10 degrees with the third direction among the hexagonal sides and the side (A3') facing the side may be in a range of −10 degrees to 10 degrees. In another example, the angle may be −9 degrees or more, −8 degrees or more, −7 degrees or more, −6 degrees or more, −5 degrees or more, −4 degrees or more, −3 degrees or more, −2 degrees or more, or −1 degree or more, may be 9 degrees or less, 8 degrees or less, 7 degrees or less, 6 degrees or less, 5 degrees or less, 4 degrees or less, 3 degrees or less, 2 degrees or less, or 1 degree or less, and may be about 0 degrees. The angle may be an angle having a small absolute value among the angles formed by A3 and A3'. That is, any one side (A3) of the hexagon and the side (A3') opposite thereto may be substantially parallel.

The method of forming a diffraction grating in the first and second diffraction optical elements is not particularly limited, and a known method may be applied to form the diffraction grating. For example, a method of directly forming a diffraction grating by placing a mask having a predetermined pattern formed on a material such as glass or plastic that can be applied as a light guide part, and then exposing it with a laser, an electron beam, or extreme ultraviolet light (lithography) or a method (imprinting) of transferring a diffraction grating using a member or the like that a pattern of a concavo-convex structure is formed on the material may be applied.

The first diffraction optical element (120) and the first and second regions (131, 132) in the second output diffraction optical element may each have grating vectors (V1, V2, V3) defined as "sizes" inversely proportional to the pitches (P1, P2, P3) of the linear diffraction gratings of the elements and "directions" perpendicular to the traveling direction of the linear diffraction grating. The size of the grating vector may be defined by Equation 1 below.

$$|V| = 2\pi/P \qquad \text{[Equation 1]}$$

where, |V| means the size of the grating vector, and P means the pitch of the linear diffraction grating.

FIG. 8 illustrates a preferred combination of grating vectors of the first diffraction optical element, the first region and the second region of the present application. In one example, the sum of the respective grating vectors (V1, V2, V3) of the first diffraction optical element (120) and the first and second regions (131, 132) may be a zero vector. That is, by adding all the components of the coordinates given to the grating vectors, respectively, a vector in which all components are zero may be formed.

The linear diffraction grating formed in the first region and the linear diffraction grating formed in the second region are symmetrical to each other, and the respective grating vectors (V1, V2, V3) of the first diffraction optical element (120) and the first and second regions (131, 132) have the same size as each other, and the angles formed by two vectors among the grating vectors (V1, V2, V3) of the first diffraction optical element (120) and the first and second regions (131, 132) may each be in a range of 50 degrees to 70 degrees. In another example, the angle may be 53 degrees or more, 55 degrees or more, 57 degrees or more, or 59 degrees or more, may be 67 degrees or less, 65 degrees or less, 63 degrees or less, or 61 degrees or less, and may be about 60 degrees. The angle may mean an angle having a small absolute value among angles formed by two vector directions of the three vectors. As illustrated in FIG. 8, the angle formed by each of V1 to V3 is most suitably about 60 degrees, but is not limited thereto.

In the present application, the most suitable diffraction grating arrangements have been shown in FIGS. 9a to 9c. The traveling direction of the linear diffraction grating in the first diffraction optical element (120) may form (orthogonal) an angle of 90 degrees with the horizontal line (H) parallel to the x-axis, as shown in FIG. 9a (which may also be understood within the aforementioned error range). Also, the traveling direction of the linear diffraction grating in the first region (131) may form an angle of 30 degrees with the horizontal line (H) parallel to the x-axis, as shown in FIG. 9b (which may also be understood within the aforementioned error range). Then, the traveling direction diffraction pattern of the linear diffraction grating in the second region (132) may form an angle of −30 degrees with the horizontal line (H) parallel to the x-axis, as shown in FIG. 9c (which may also be understood within the aforementioned error range).

As shown in FIGS. 9a to 9c, when the pitches (P1, P2, P3) of the respective linear diffraction gratings are all the same, the sizes of the respective grating vectors are all the same according to Equation 1 above. Here, when the directions of the grating vectors (V1, V2, V3) are approximately perpendicular to the traveling directions of the respective linear diffraction gratings, the direction of the grating vector (V1) in the first diffraction optical element (120) may be approximately parallel to the x-axis direction, the direction of the grating vector (V2) in the first region may form an angle of about −60 degrees with respect to the x-axis direction, and the direction of the grating vector (V3) in the second region may form an angle of about 60 degrees with respect to the x-axis direction. Accordingly, the respective grating vectors of the first diffraction optical element, and the first and second regions form an angle of about 60 degrees to each other, where the respective sizes may be approximately the same, so that if all the vectors are added, a zero vector may be formed.

The diffraction light guide plate of the present application has an advantage suitable for application to an augmented reality (AR) realization device. In the diffraction light guide plate, it is particularly suitable when the ratio of the region (or length) occupied by each of the first to third regions in the second diffraction optical element has been properly adjusted.

FIG. 5 is a side view schematically showing a region where a user can recognize an image output by the diffraction light guide plate of the present application. Specifically, the three axes perpendicular to each other formed by the diffraction light guide plate of the present application are set to the x-axis, the y-axis and the z-axis, but when the z-axis has been set to be in a direction parallel to the direction of gravity, the relationship between the length (Z1) of the first region (131) in the z-axis direction, the length (Z2) of the second region (132) in the z-axis direction and the length (Z3) of the third region (133) in the z-axis direction may be appropriately adjusted.

In one example, the ratio (Z3/(Z1+Z2+Z3)) of the length (Z3) of the third region in the z-axis direction to the total length (Z1+Z2+Z3) of the first to third regions in the z-axis direction may be in a range of 0.3 to 0.9. In another example, the ratio may be 0.33 or more, 0.35 or more, 0.37 or more, 0.39 or more, 0.40 or more, or 0.41 or more, and may be 0.89 or less, 0.87 or less, 0.85 or less, or 0.84 or less.

The ratio (Z1/Z2) of the length (Z1) of the first region in the z-axis direction to the length (Z2) of the second region in the z-axis direction may also be adjusted suitably. In one example, the ratio may be in a range of 0.9 to 1.1. In another example, the ratio may be 0.93 or more, 0.95 or more, 0.97 or more, or 0.99 or more, may be 1.07 or less, 1.05 or less, 1.03 or less, or 1.01 or less, and may be, preferably, 1 or so. In addition, the length (Z1) of the first region in the z-axis direction and the length (Z2) of the second region in the z-axis direction may be each appropriately adjusted within a range satisfying the ratio. The Z1 or Z2 value may be in a range of 1 mm to 15 mm while satisfying the ratio. In another example, the value may be 1.5 mm or more, 2.0 mm or more, 2.2 mm or more, or 2.3 mm or more, and may be 14 mm or less, 13 mm or less, 12 mm or less, or 11 mm or less.

The length (Z3) of the third region in the z-axis direction may also be appropriately adjusted. In one example, the length (Z3) may be in a range of 15 mm to 25 mm.

As described below, when the diffraction light guide plate has been applied to an augmented reality realization device such as eyewear, and the like, the Z1 or Z2 value may be adjusted appropriately in consideration of an eye relief (the shortest distance between the user's pupil and the lens, for example, the shortest distance from the left eye lens to the left eye pupil or the shortest distance from the right eye lens to the right eye pupil), and the like.

In addition, when the diffraction light guide plate has been applied to an augmented reality realization device such as eyewear, and the like, the Z3 value may be determined appropriately depending on the length of an eye motion box (EMB) of a user pupil in the z-axis direction that can recognize an image emitted from the eyewear. Generally, it can be set so that the length of the eye motion box in the z-axis direction and the length of the third region in the z-axis direction are the same (in this case, an error within +/−5% or so can be considered).

As shown in FIG. 5, the value of Z1 or Z2 may be determined according to the above-described eye relief and the viewing angle (the angle formed by two directions from the focus of the light emitted from the diffraction light guide plate to both ends of the output diffraction optical element, θ in FIG. 5). Specifically, the value of Z1 or Z2 may be determined according to Equation 1 below:

$$Y = X \times \tan(\theta/2) \qquad \text{[Equation 2]}$$

In Equation 2 above, Y is a Z1 or Z2 value, X is an eye relief, θ is a viewing angle, and the eye relief and viewing angle are as defined above.

The eye relief is generally set within a range of 15 mm to 30 mm. In addition, the viewing angle is generally set within a range of 18 degrees to 40 degrees. Therefore, when such a value has been substituted into Equation 2, the above-described value of Z1 or Z2 may be derived.

Here, the first to third regions may have the same width and breadth, whereby the respective widths of the first to third regions may be determined according to the ratio of the respective z-axis direction lengths of the first to third regions. Meanwhile, if the cross section formed by the second diffraction optical element in the light guide part is not rectangular, the ratio may mean the ratio of the line segment lengths corresponding to the first to third regions within the line segment having the largest length among the z-axis direction lines of the relevant diagram.

FIGS. 7a to 7c are plan views illustrating light paths in the diffraction light guide plate of the present application shown in FIG. 4, respectively.

The first diffraction optical element may be an input diffraction optical element. The input diffraction optical element may mean an optical element that receives light incident from a light source and performs a function of totally reflecting the received light into the light guide part by diffraction.

The second diffraction optical element may be an output diffraction optical element. The output diffraction optical element may mean an optical element that receives the light totally reflected from the input diffraction optical element and performs a function of outputting the received light from the light guide part by diffraction.

Light incident on the light guide part (110), specifically, light incident on the first diffraction optical element (120) is totally reflected in the light guide part by diffraction. As described above, in order for total reflection of light to occur inside an element, the refractive index of the element must be larger than that of the medium adjacent to the element. Since the light guide part is generally adjacent to air, the light guide part may be made of a material having a higher refractive index than that of air, for example, a material such as glass or plastic. In addition, since the first and second diffraction optical elements are formed on the light guide part, the material constituting them may also be the same as the light guide part.

In the first diffraction optical element (120), light (L1a, L1b, L1c) incident from a light source may be diffracted by the diffraction grating formed in the first diffraction optical element. The diffracted light is totally reflected into the light guide part via the first diffraction optical element. The first diffraction optical element may emit the totally reflected light toward the second diffraction optical element.

At this time, among the light incident from the first diffraction optical element toward the second diffraction optical element, light incident onto the first region may be incident onto the first region without passing through the second region and the third region. In addition, light incident onto the second region may be incident onto the second region without passing through the first region and the third region. Light incident onto the third region may be incident onto the third region without passing through the first region and the second region.

The first and second regions (131, 132) may each expand light emitted from the first diffraction optical element in a single direction. Specifically, the first and second regions may each receive light (L2a, L2b) emitted from the first diffraction optical element, and expand the received light in a single direction by diffraction. A part of the light (L2a, L2b) emitted from the first diffraction optical element (120) may be diffracted while passing through the first region (131) or the second region (132) to change the path, and the remaining part may be totally reflected to the existing light path. Also, the first and second regions may each receive light (L3a, L3b, L3c) expanded in another region, and emit the received light from the second diffraction optical element by diffraction (L4a, L4b, L4c). For example, the first region (131) may receive light (L3b and/or L3c) expanded from the second region (132) and/or the third region (133), and output the received light from the diffraction light guide plate by diffraction (L4b, L4c). In addition, the second region (132) may receive light (L3a and/or L3c) expanded from the first region (131) and/or the third region (133), and emit the received light from the second diffraction optical element by diffraction (L4a, L4c).

The third region (133) may expand light (L2c) emitted from the first diffraction optical element in two directions (L3c) or allow the light to be emitted from the second diffraction optical element (L4c). A part of the light (L2c) diffracted from the first diffraction optical element (120) may be diffracted while passing through the third region (133) to change the path, and the remaining part may be totally reflected to the existing light path. The third region may receive light totally reflected from the first diffraction optical element, and expand the received light in two directions, for example, directions toward the first region (131) and the second region (132) by diffraction. In addition, the third output diffraction optical element may allow the light received from the first diffraction optical element to be emitted from the second diffraction optical element by diffraction. The third region may also allow light expanded from another region in the second diffraction optical element to be emitted from the second diffraction optical element. The third region may receive light expanded from another region, for example, the first region and/or the second region, and emit the received light from the second diffraction optical element by diffraction.

As described above, the size of the region (a in FIG. 3) where the user can recognize all the images output by the diffraction light guide plate in the form as in FIG. 2 is relatively small, so that in order to recognize all the images output from the diffraction light guide plate in the form as in FIG. 2, there is a problem that the location of the pupil of the user is limited.

However, as shown in FIG. 5, the diffraction light guide plate of the present application is configured such that light emitted from the first diffraction optical element can be emitted from one diffraction optical element (second diffraction optical element), so that even though the total region of the light guide plate is not increased, it is possible to increase the size of the output image. At this time, the area of the second diffraction optical element may be, for example, in a range of 1 cm$^2$ to 50 cm$^2$. In another example, the area may be 1 cm$^2$ or more, 2 cm$^2$ or more, 3 cm$^2$ or more, 4 cm$^2$ or more, 5 cm$^2$ or more, 6 cm$^2$ or more, 7 cm$^2$ or more, 8 cm$^2$ or more, 9 cm$^2$ or more, or 10 cm$^2$ or more, and may be 45 cm$^2$ or less, 40 cm$^2$ or less, 35 cm$^2$ or less, 30 cm$^2$ or less, 25 cm$^2$ or less, 20 cm$^2$ or less, 15 cm$^2$ or less, or 10 cm$^2$ or less.

In addition, the size (a) of the region where the user can recognize all the images output by the diffraction light guide plate of the present application is relatively large, so that there is an advantage that the position of the user pupil is not limited.

In another example, the present application provides a use of the diffraction light guide plate. Specifically, the present application provides an augmented reality or virtual reality device comprising the diffraction light guide plate.

For example, the device may be eyewear. The eyewear may comprise a left eye lens and a right eye lens; and a frame for supporting the left eye lens and the right eye lens. In addition, the left eye lens and the right eye lens may each comprise the diffraction light guide plate.

Here, the eyewear may further comprise a projector. The projector may be located in the frame. In addition, the projector may project reproduced light onto at least one lens of the left eye lens and the right eye lens.

The method of driving the eyewear is known. For example, the eyewear may be driven such that light incident from the projector is output through the diffraction light guide plate, and the user is capable of recognizing the output light.

Advantageous Effects

The diffraction light guide plate of the present application has an advantage suitable for miniaturizing or lightening an optical device.

The diffraction light guide plate of the present application can increase the area of the output image without increasing the total size thereof.

The diffraction light guide plate of the present application has an advantage that the pupil position of the user is not limited.

DETAILED DESCRIPTION

Hereinafter, the present application will be described in detail with reference to examples, but the scope of the present application is not limited by the following examples.

Experimental Examples

In the following experimental examples, the relevant diffraction optical element was designed using the RCWA (rigorous coupled wave analysis) function of LIGHT-TRANS' Virtual Lab software, and the light emission efficiency of the element was calculated.

Experimental Example 1

Figure 9A:
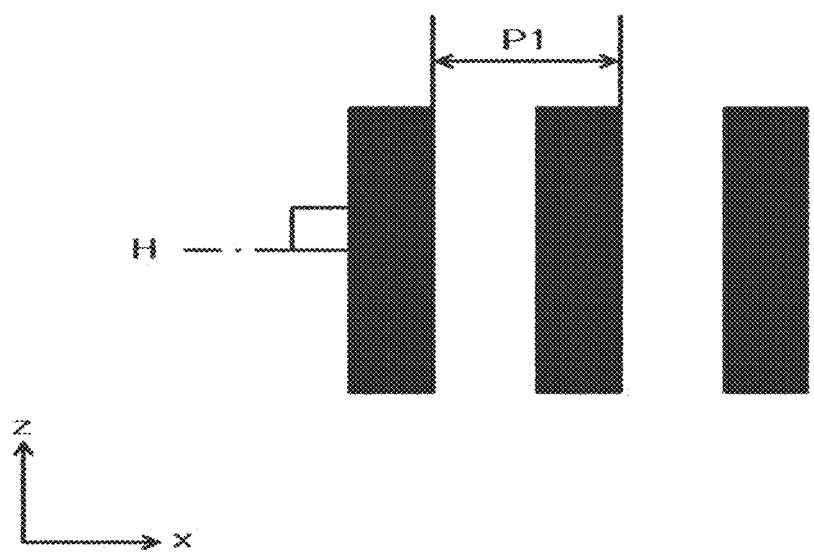
FIGS. 9a to 9c illustrate diffraction gratings formed on the first diffraction optical element, the first region and the second region in the diffraction light guide plate of the present application.
Figure 9B:
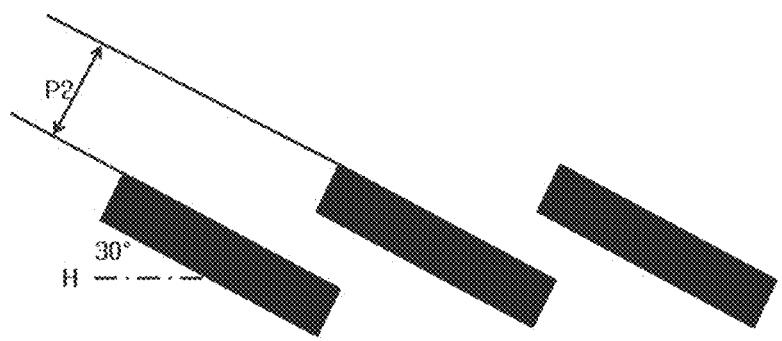
Figure 9C:
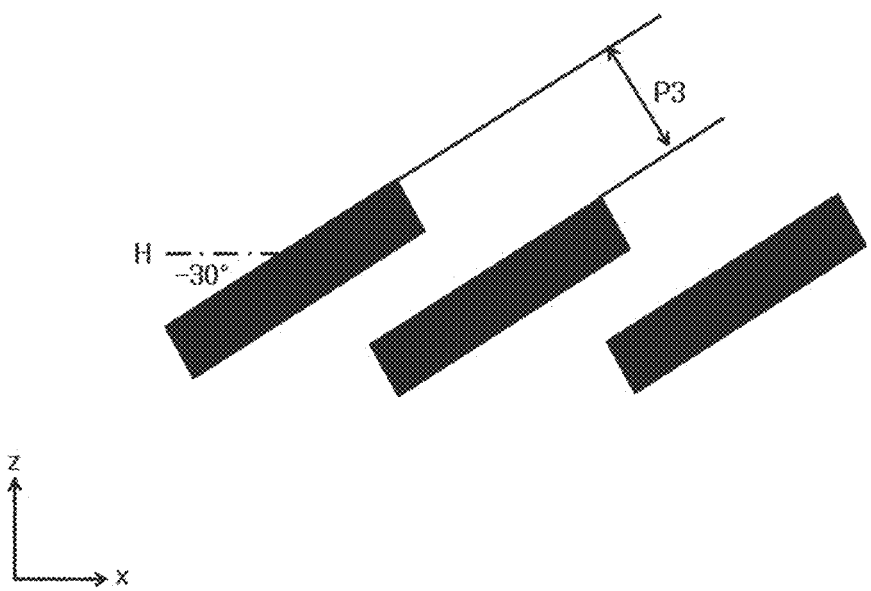

A diffraction optical element was designed, in which a linear diffraction grating in the form of grooves spaced at an average pitch of about 388 nm in a single direction as in FIG. 9a and having an average width of about 0.55 times the average pitch was formed on a surface of a glass substrate having a refractive index of about 1.8 for light with a wavelength of 525 nm. The efficiency that light having a wavelength of about 525 nm totally reflected inside the diffraction optical element was emitted toward the atmosphere from the surface of the diffraction optical element by diffraction was measured according to Equation 1 below. The results of calculating the light emission efficiency of the diffraction optical element for the height of the diffraction pattern (shown as depth in the drawing) were shown in FIG. 10:

$$\text{Light emission efficiency (\%)} = (A/B) \times 100 \qquad \text{[Equation 3]}$$

In Equation 3 above, A is the light quantity of light output from the diffraction optical element, and B is the total light quantity of light totally reflected inside the diffraction optical element.

Experimental Example 2

Figure 11:
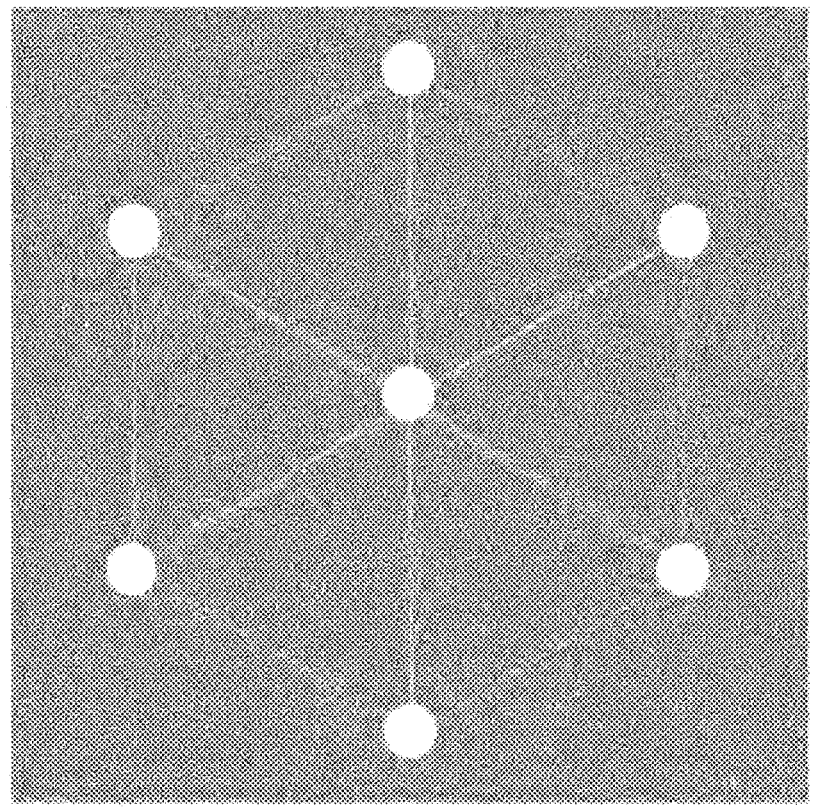
FIG. 11 is a schematic view of a diffraction optical element of Experimental Example 2.

A diffraction optical element in the form that cylindrical grooves having a diameter of about 200 nm were arranged on a surface of a glass substrate having a refractive index of about 1.8 for light with a wavelength of 525 nm in an approximately hexagonal shape as in FIG. 11 was designed. Specifically, a linear diffraction grating having an average pitch of about 388 nm was formed in the diffraction optical element.

Figure 10:
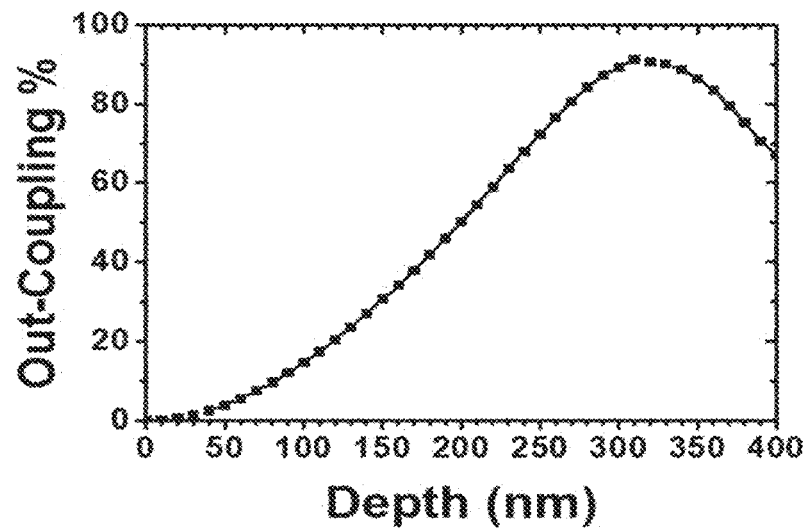
FIG. 10 illustrates the light emission efficiency for the height of the diffraction grating in the diffraction optical element, according to Experimental Example 1.
Figure 12:
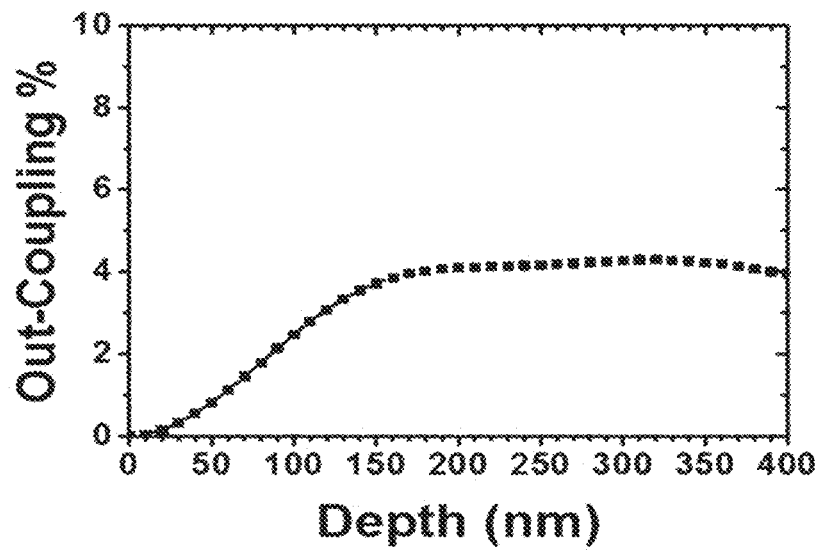
FIG. 12 illustrates the light emission efficiency for the height of the diffraction grating in the diffraction optical element, according to Experimental Example 2.

The efficiency that light having a wavelength of about 525 nm totally reflected inside the diffraction optical element was emitted toward the atmosphere from the surface of the diffraction optical element by diffraction was measured according to Equation 3 above. The results of calculating the light emission efficiency of the diffraction optical element for the height of the diffraction grating (shown as depth in the drawing) were shown in FIG. 12:

According to FIGS. 10 and 12, it can be confirmed that in the case of having a linear diffraction grating as the first diffraction optical element and the first region or the second region of the second diffraction optical element of the present application, the light emission efficiency varies depending on to the height (or depth) of the grating. In addition, in the case of an element having diffraction gratings in the form that linear diffraction gratings overlap as the third region, it can be confirmed that the light emission efficiency is mostly low (5% or less) regardless of the depth (or height).

Comparative Example

Figure 1:
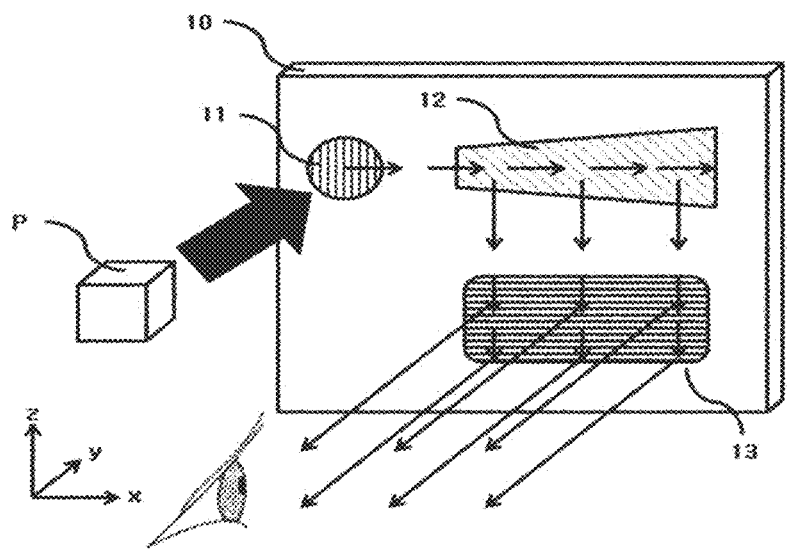
FIG. 1 schematically illustrates a conventional diffraction light guide plate structure.
Figure 2:
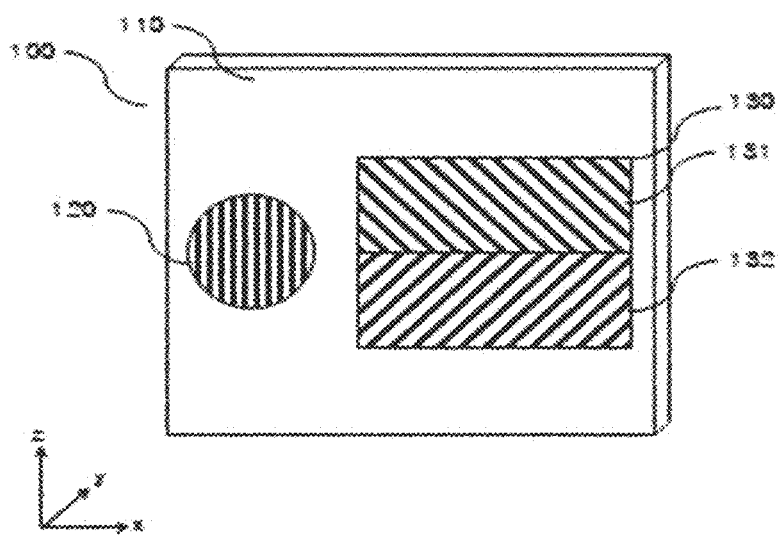
FIG. 2 schematically illustrates the structure of a diffraction light guide plate introduced to solve the problem of the diffraction light guide plate according to FIG. 1.
Figure 3:
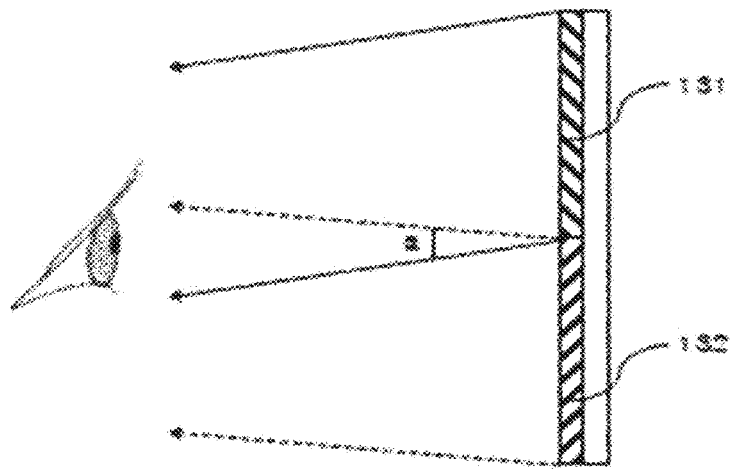
FIG. 3 is a diagram for indicating a positional range of user's pupil to recognize an image emitted from the diffraction light guide plate according to FIG. 2.

A diffraction light guide plate was designed, in which a first diffraction optical element having a linear diffraction grating and a second diffraction optical element having first and second regions having linear diffraction gratings in different traveling directions were disposed as in FIG. 2. It was designed such that the traveling direction of the linear diffraction grating in the first diffraction optical element had the same direction as the z-axis direction of FIG. 2 and the traveling directions of the linear diffraction gratings in the first and second regions were in directions of about 30 degrees and about −30 degrees with the x-axis of FIG. 2, respectively. Here, the pitch of each diffraction grating was about 388 nm, the width was about 0.55 times the pitch, and the height was about 100 nm.

Figure 13:
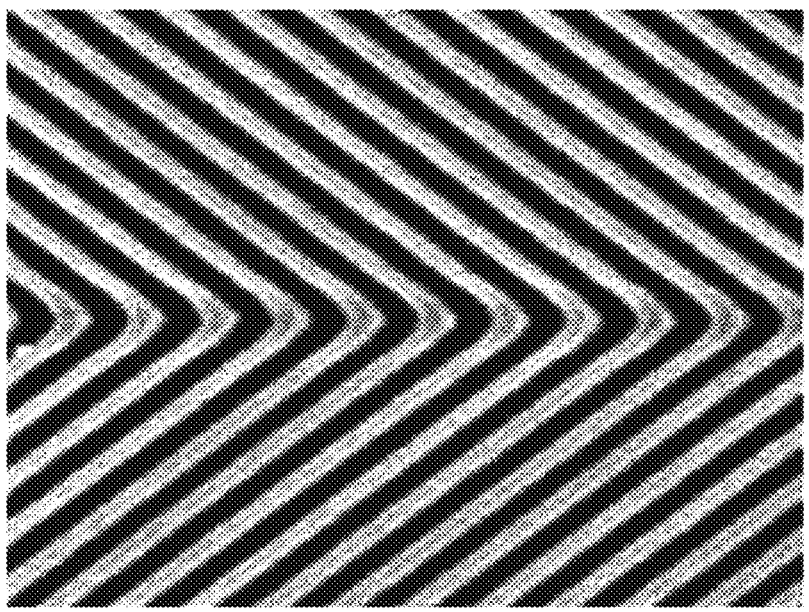
FIG. 13 is a SEM photograph of the second diffraction optical element of Comparative Example.

The second output diffraction optical element of Comparative Example was photographed by SEM (scanning electron microscope, HITACHI S 4800), and the photograph was shown in FIG. 13. Then, the simulation results of the images that the images incident at the incident angles of about 0 degrees ((a) in FIG. 14) and about 5 degrees ((b) in FIG. 14) based on the normal of the first diffraction optical element in the diffraction light guide plate were output from the normal of the second optical element were shown in FIG. 14. A photograph obtained by inputting an image to the first diffraction optical element of the diffraction light guide plate using a projector (Miniray, Sekonix) at an incident angle of about 5 degrees and photographing the image, in which the relevant image was output from the second diffraction optical element of the light guide plate, using a CMOS (complementary metal-oxide semiconductor) camera (DCC1645C, Thorlabs, Inc.) was shown in FIG. 15.

Figure 14:
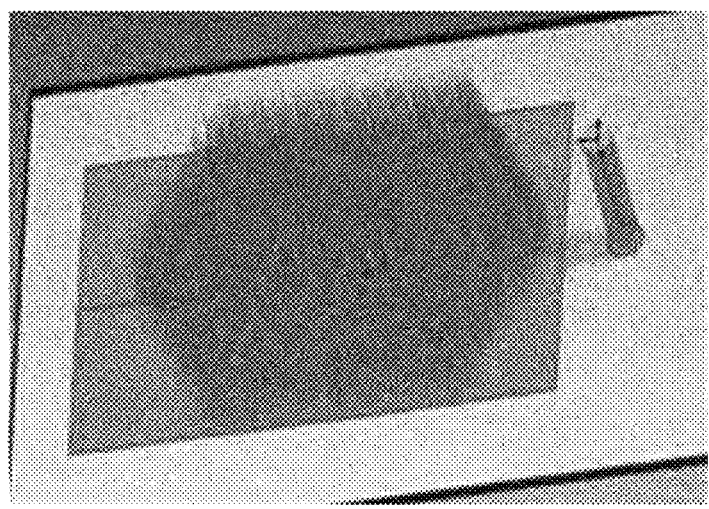
FIG. 14 is simulation results of images output by the diffraction light guide plate of Comparative Example.
Figure 14:
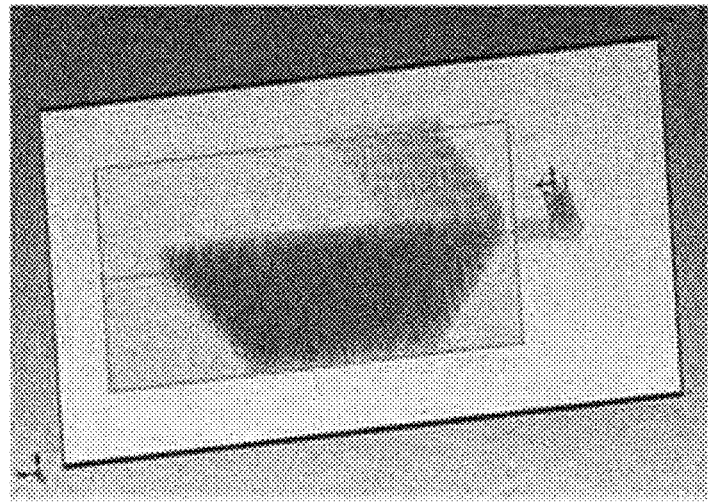
Figure 15:
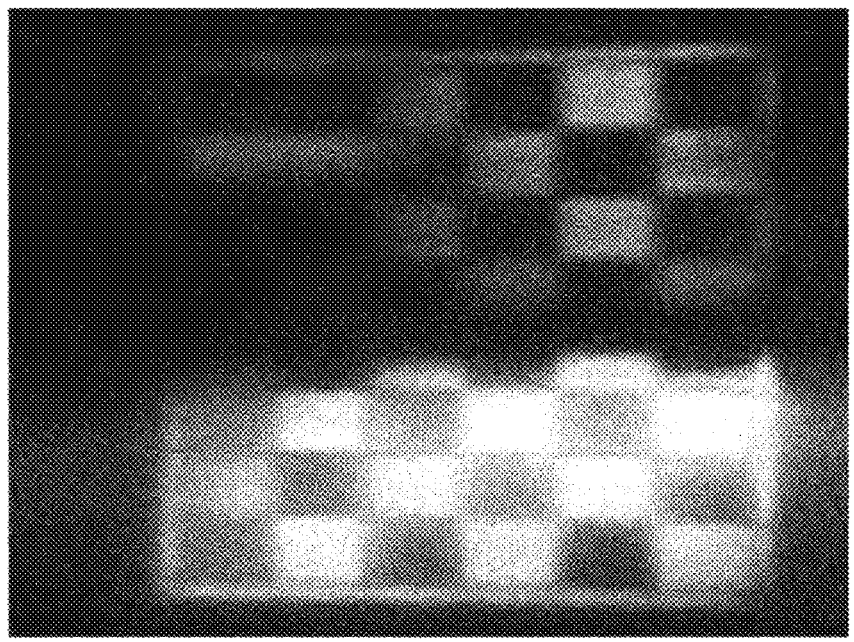
FIG. 15 is a photograph of an image output by the diffraction light guide plate of Comparative Example.

According to FIGS. 14 and 15, it can be confirmed that in the diffraction light guide plate according to Comparative Example, the input image is divided and output from the respective output diffraction optical elements, and thus if the incident angle of the image is only slightly changed (about 5 degrees), a part of the image is not output, whereby the image corresponding to the sites adjacent to the plurality of regions in the output diffraction optical element is not clearly recognized, as shown in FIG. 15.

Example

Figure 4:
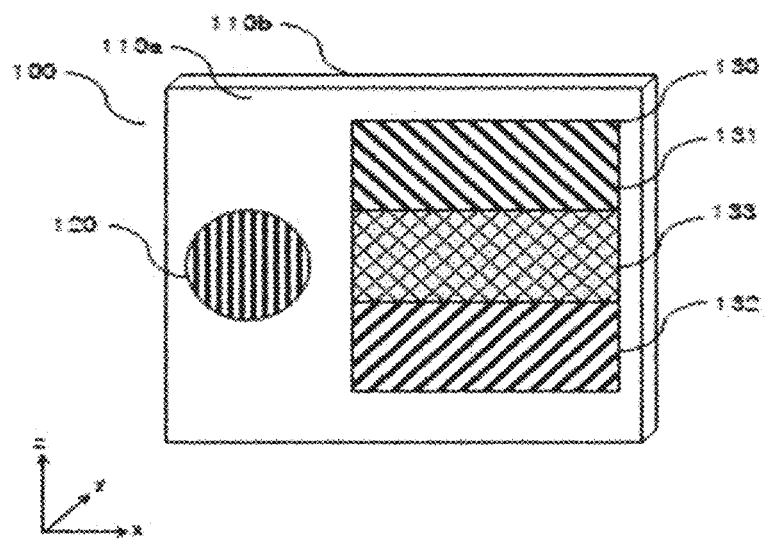
FIG. 4 schematically illustrates a diffraction light guide plate structure of the present application.
Figure 5:
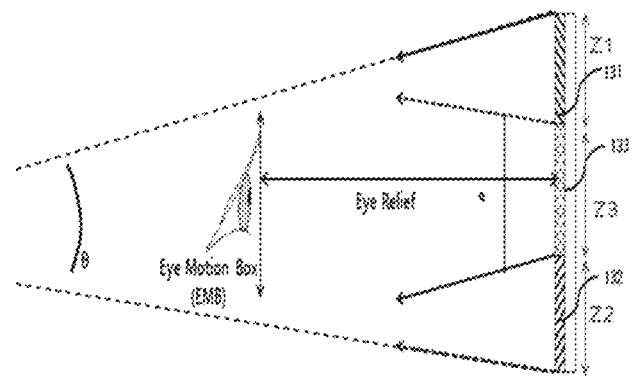
FIG. 5 is a diagram for explaining a pupil range of a user who can recognize an image emitted from the diffraction light guide plate according to FIG. 4.
Figure 6:
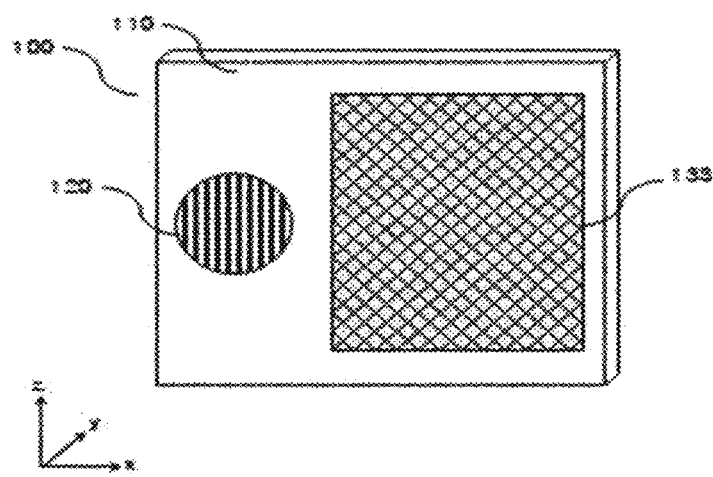
FIG. 6 schematically illustrates the structure of a second diffractive optical element that can be considered to design.
Figure 7A:
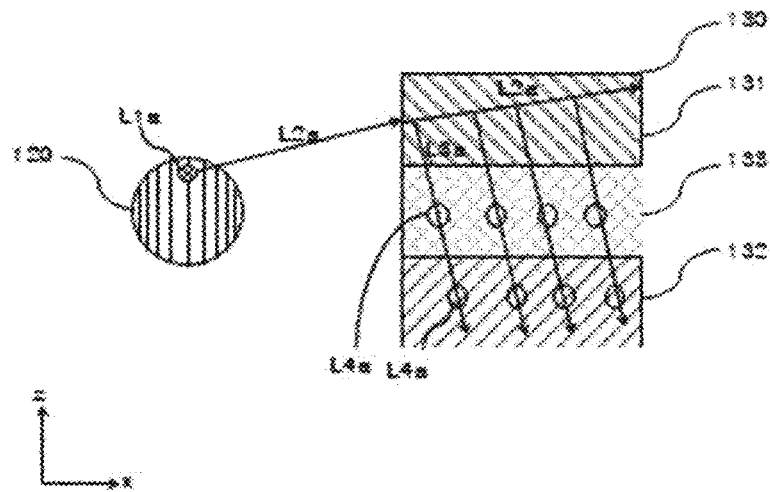
FIGS. 7a to 7c are plan views illustratively showing light paths in the diffraction light guide plate of the present application.
Figure 7B:
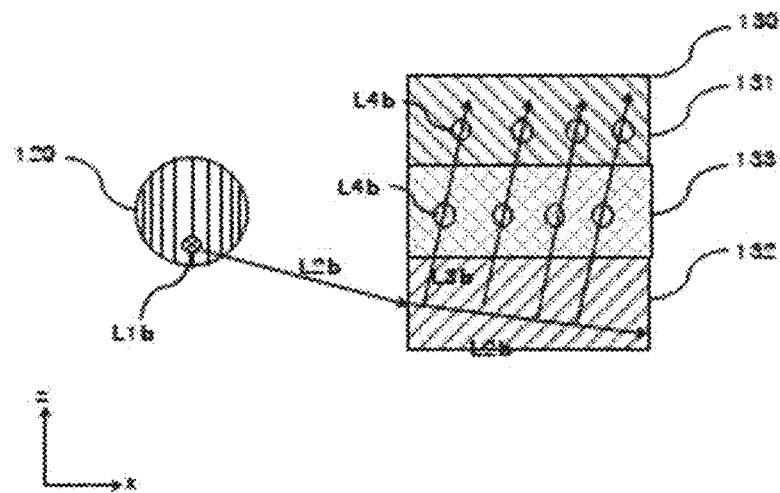
Figure 7C:
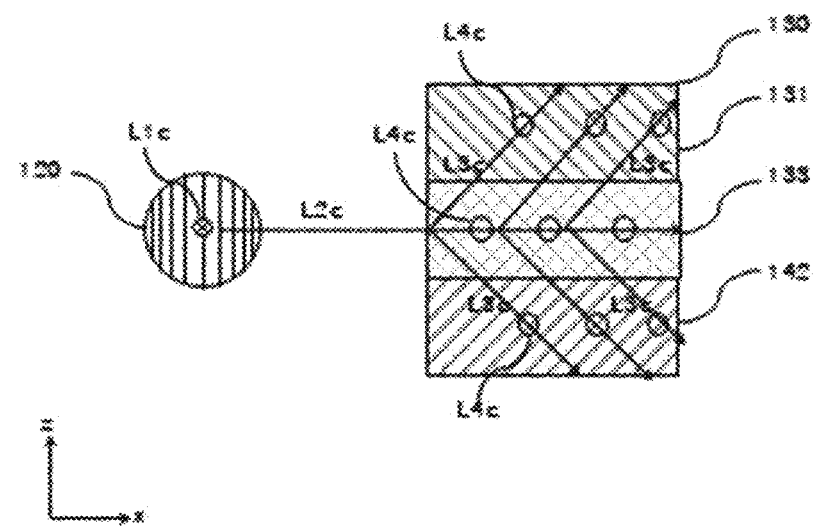
Figure 8:
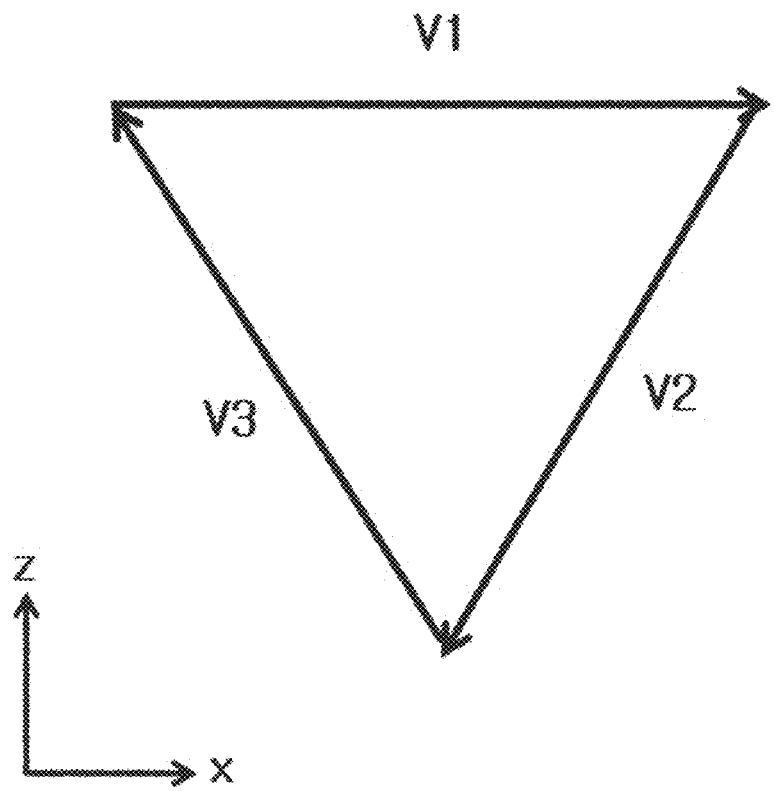
FIG. 8 illustrates a combination of grating vectors of the first diffraction optical element, and the first region and the second region in the diffraction light guide plate of the present application.

A diffraction light guide plate was produced in the same manner as in Experimental Example 2, but in the same manner as in Comparative Example, except that a diffraction optical element having a depth of about 50 nm as a third region of the second diffraction optical element is disposed between the first region and the second region. At this time, the ratio ($Z3/(Z1+Z2+Z3)$) of the second diffraction optical element occupied by the length (length in the direction parallel to the z-axis in FIG. 4, Z3) of the third region in the second optical element was approximately 0.33 or so.

Figure 16:
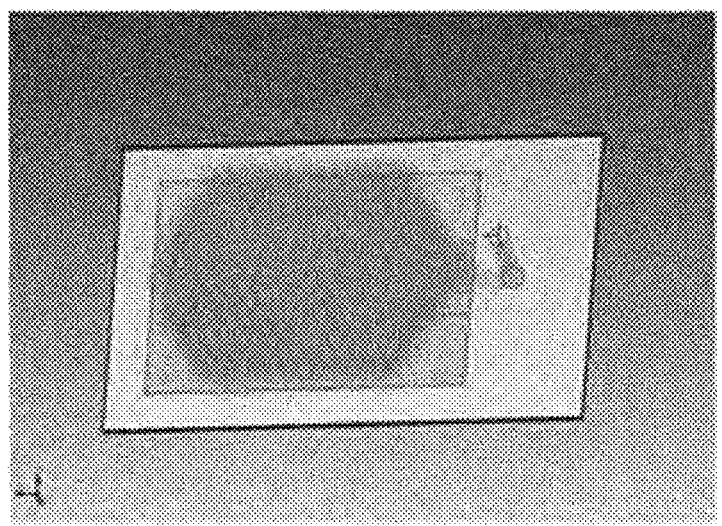
FIG. 16 is simulation results of images output by the diffraction light guide plate of Example.
Figure 16:
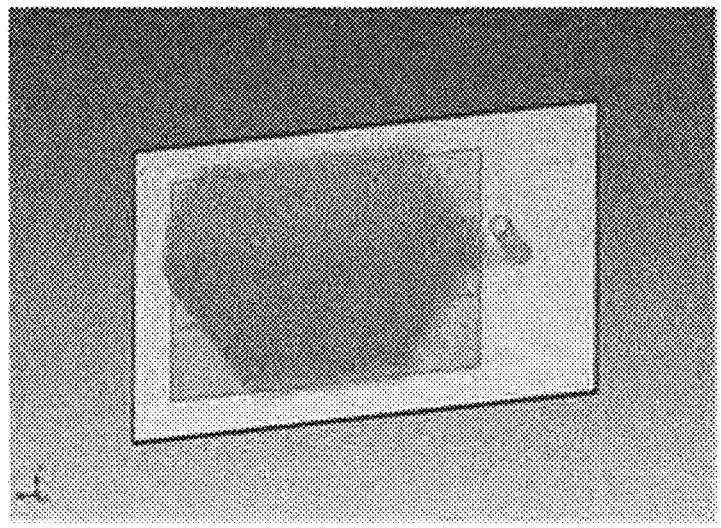

Then, the simulation results of the images that the images incident at the incident angles of about 0 degrees ((a) in FIG. 16) and about 5 degrees ((b) in FIG. 16) based on the normal of the first diffraction optical element in the diffraction light guide plate were output from the normal of the second optical element were shown in FIG. 16.

According to FIG. 16, it can be seen that all the images incident on the diffraction light guide plate are output from the respective regions in the second diffraction optical element. Specifically, according to FIG. 16, it can be confirmed that the diffraction light guide plate, in which the diffraction optical element formed by diffraction gratings in the form that linear diffraction gratings having traveling directions different from each other overlap is disposed between diffraction optical elements formed by the linear diffraction gratings as in the present application, can output all the images corresponding to the respective regions regardless of the incident angles of the input images.

The invention claimed is:

1. A diffraction light guide plate comprising first and second diffraction optical elements, wherein the first diffraction optical element is an element capable of receiving light incident onto the first diffraction optical element and outputting the received light toward the second diffraction optical element, and the second diffraction optical element is an element capable of emitting light therefrom out of the incident light from the first diffraction optical element, and
wherein the first diffraction optical element comprises a linear diffraction grating extending in a first direction,
the second diffraction optical element comprises first and second regions, and a third region existing between the first and second regions,
the first region comprises a linear diffraction grating extending in a second direction different from the first direction,
the second region comprises a linear diffraction grating extending in a third direction different from the first and second directions,
the third region comprises a diffraction grating in the form that the linear diffraction gratings of the first and second regions overlap, and
the first to third regions are disposed such that light incident from the first diffraction optical element is incident onto the first region without passing through the second and third regions, that light incident from the first diffraction optical element is incident onto the second region without passing through the first and third regions, and that light incident from the first diffraction optical element is incident onto the third region without passing through the first and second regions.

2. The diffraction light guide plate according to claim 1, wherein
the first to third directions form a triangle.

3. The diffraction light guide plate according to claim 2, wherein
an angle formed by the second direction and the third direction is in a range of 50 degrees to 70 degrees.

4. The diffraction light guide plate according to claim 3, wherein
an angle formed by the first direction and the second direction or an angle formed by the first direction and the third direction is in a range of 50 degrees to 70 degrees.

5. The diffraction light guide plate according to claim 1, wherein
an average pitch of the diffraction grating in the first or second region is in a range of 200 nm to 600 nm.

6. The diffraction light guide plate according to claim 5, wherein
an average width of the diffraction grating in the first or second region is in a range of 0.1 times to 0.9 times the average pitch of the diffraction grating.

7. The diffraction light guide plate according to claim 1, wherein
an average height of the diffraction grating in the first or second region is in a range of 1 nm to 1 µm.

8. The diffraction light guide plate according to claim 1, wherein
a refractive index of the first or second region is in a range of more than 1.0 to 2.0 or less for light having a wavelength of 525 nm.

9. The diffraction light guide plate according to claim 1, wherein
the diffraction grating of the third region consists of a plurality of pillars, and
an angle formed by the direction of any one side of the hexagon and the first direction is in a range of −10 degrees to 10 degrees, an angle formed by the direction of another side of the hexagon and the second direction is in a range of −10 degrees to 10 degrees, and an angle formed by the direction of another side of the hexagon and the third direction is in a range of −10 degrees to 10 degrees with the proviso that when six pillars among the plurality of pillars have been selected such that a virtual line connecting the six pillars forms a hexagon.

10. The diffraction light guide plate according to claim 9, wherein
the angle formed by a first side among the hexagonal sides forming the angle in the range of −10 degrees to 10 degrees with the first direction and a side among the hexagonal sides facing the first side is in a range of −10 degrees to 10 degrees,
the angle formed by a second side among the hexagonal sides forming the angle in the range of −10 degrees to 10 degrees with the second direction and a side among the hexagonal sides facing the second side is in a range of −10 degrees to 10 degrees, and
the angle formed by a third side among the hexagonal sides forming the angle in the range of −10 degrees to 10 degrees with a third direction and a side among the hexagonal sides facing the third side is in a range of −10 degrees to 10 degrees.

11. The diffraction light guide plate according to claim 9, wherein
an average pitch of the pillars in the diffraction grating of the third region is in a range of 200 nm to 600 nm.

12. The diffraction light guide plate according to claim 11, wherein
an average width of the pillars in the diffraction grating of the third region is in a range of 0.1 times to 1.3 times the average pitch of the pillars.

13. The diffraction light guide plate according to claim 9, wherein
an average height of the pillars in the diffraction grating of the third region is in a range of 1 nm to 1 µm.

14. The diffraction light guide plate according to claim 9, wherein
a refractive index of the third region is in a range of more than 1.0 to 2.0 or less for light having a wavelength of 525 nm.

15. The diffraction light guide plate according to claim 1, wherein
a ratio (Z3/(Z1+Z2+Z3)) of a length (Z3) of the third region in the z-axis direction to a total length (Z1+Z2+Z3) of the first to third regions in the z-axis direction is in a range of 0.3 to 0.9, with the proviso that when three axes perpendicular to each other formed by the diffraction light guide plate are set to the x-axis, the y-axis and the z-axis, and the z-axis is set to be in a direction parallel to the direction of gravity.

16. The diffraction light guide plate according to claim 15, wherein
a ratio (Z1/Z2) of a length (Z1) of the first region in the z-axis direction to a length (Z2) of the second region in the z-axis direction is in a range of 0.9 to 1.1.

17. The diffraction light guide plate according to claim 16, wherein
the length (Z1) of the first region in the z-axis direction or the length (Z2) of the second region in the z-axis direction is in a range of 1 mm to 15 mm.

18. The diffraction light guide plate according to claim 15, wherein
a length (Z3) of the third region in the z-axis direction is in a range of 15 mm to 25 mm.

19. The diffraction light guide plate according to claim 1, wherein
the light incident onto the first diffraction optical element is an image signal, and the second diffraction optical element forms an image output surface.

20. The diffraction light guide plate according to claim 1, wherein
an area of the second diffraction optical element is in a range of 1 cm$^2$ to 50 cm$^2$.

* * * * *